(12) United States Patent
Handa et al.

(10) Patent No.: US 10,451,026 B2
(45) Date of Patent: Oct. 22, 2019

(54) UNDERWATER DEVICE AND METHOD FOR CONTROLLING POSTURE OF UNDERWATER DEVICE

(71) Applicant: IHI Corporation, Tokyo (JP)

(72) Inventors: Norihisa Handa, Tokyo (JP); Shigeki Nagaya, Tokyo (JP); Yoshiyuki Yamane, Tokyo (JP); Akio Ito, Tokyo (JP)

(73) Assignee: IHI CORPORATION, Tokyo (JP)

( * ) Notice: Subject to any disclaimer, the term of this patent is extended or adjusted under 35 U.S.C. 154(b) by 4 days.

(21) Appl. No.: 14/875,824

(22) Filed: Oct. 6, 2015

(65) Prior Publication Data

US 2016/0201641 A1 Jul. 14, 2016

Related U.S. Application Data

(63) Continuation of application No. PCT/JP2014/061195, filed on Apr. 21, 2014.

(30) Foreign Application Priority Data

Apr. 22, 2013 (JP) .................................. 2013-089438

(51) Int. Cl.
F03B 17/06 (2006.01)
F03B 13/10 (2006.01)
(Continued)

(52) U.S. Cl.
CPC ............ *F03B 17/061* (2013.01); *F03B 13/10* (2013.01); *F03B 13/264* (2013.01); *F03B 15/00* (2013.01);
(Continued)

(58) Field of Classification Search
CPC ....... Y02E 10/28; Y02E 10/725; F03B 13/00; F03B 17/061; F03B 13/10; F03B 13/264;
(Continued)

(56) References Cited

U.S. PATENT DOCUMENTS 2,640,550 A * 6/1953 Knapp ...................... F02C 9/58
374/110
4,648,345 A 3/1987 Wham et al.
(Continued)

FOREIGN PATENT DOCUMENTS

CN 201963461 U 9/2011
CN 202140233 U 2/2012
(Continued)

OTHER PUBLICATIONS

International Search Report dated Jul. 29, 2014 in PCT/JP2014/061195 (4 pages).
(Continued)

*Primary Examiner* — Tulsidas C Patel
*Assistant Examiner* — Charles Reid, Jr.
(74) *Attorney, Agent, or Firm* — Rothwell, Figg, Ernst & Manbeck, P.C.

(57) ABSTRACT

This underwater device is twin-motor underwater floating-type power generation device that is provided with: a device main body that is equipped with a pair of pods that have a turbine, and with a connecting beam that connects these pods together in parallel with each other; a sinker; and tether cables that tether the device main body to the seabed via this sinker. The respective turbines of the pods are each provided with variable pitch turbine blades. This device is also provided with a depth meter that detects deviation in posture in the roll direction that is generated in the pair of pods, and a posture controller that controls the pitch of the variable pitch turbine blades of the respective turbines so as to nullify any deviation in posture in the roll direction that has been generated in the pair of pods and has been detected by the depth meter.

12 Claims, 6 Drawing Sheets

(51) Int. Cl.
*F03B 13/26* (2006.01)
*F03B 15/00* (2006.01)
(52) U.S. Cl.
CPC ....... *F05B 2240/97* (2013.01); *F05B 2260/74* (2013.01); *F05B 2270/11* (2013.01); *F05B 2270/806* (2013.01); *Y02E 10/28* (2013.01)
(58) Field of Classification Search
CPC .. F03B 15/00; F05B 2240/97; F05B 2260/74; F05B 2270/11; F05B 2270/806
USPC .................................................. 290/43, 54
See application file for complete search history.

(56) References Cited

U.S. PATENT DOCUMENTS

| | | | | |
|---|---|---|---|---|
| 4,864,152 A | * | 9/1989 | Pedersen | F03B 13/264 |
| | | | | 290/42 |
| 6,091,161 A | * | 7/2000 | Dehlsen | B63G 8/18 |
| | | | | 290/43 |
| 6,923,622 B1 | * | 8/2005 | Dehlsen | F03B 17/061 |
| | | | | 416/101 |
| 7,541,688 B2 | * | 6/2009 | Mackie | F03B 13/26 |
| | | | | 290/54 |
| 2002/0158472 A1 | * | 10/2002 | Robson | F03B 17/061 |
| | | | | 290/43 |
| 2008/0164698 A1 | * | 7/2008 | Habets | G01M 15/14 |
| | | | | 290/44 |
| 2010/0181774 A1 | * | 7/2010 | Dehlsen | B63B 21/50 |
| | | | | 290/54 |
| 2010/0332041 A1 | * | 12/2010 | Hunt | B63B 21/50 |
| | | | | 700/287 |
| 2011/0210548 A1 | * | 9/2011 | Sevenster | F03B 15/00 |
| | | | | 290/43 |
| 2012/0133140 A1 | | 5/2012 | Cornelius et al. | |
| 2012/0212350 A1 | * | 8/2012 | Magnell | F03B 13/10 |
| | | | | 340/850 |
| 2013/0150212 A1 | * | 6/2013 | Heo | F16H 61/143 |
| | | | | 477/174 |
| 2015/0028589 A1 | | 1/2015 | Cornelius et al. | |
| 2015/0028592 A1 | * | 1/2015 | Ori | F03D 1/025 |
| | | | | 290/44 |
| 2016/0017859 A1 | | 1/2016 | Handa et al. | |

FOREIGN PATENT DOCUMENTS

| | | | | |
|---|---|---|---|---|
| CN | 102459866 A | | 5/2012 | |
| GB | 2441821 A | * | 3/2008 | ............ F03B 13/183 |
| JP | 54-74043 A | | 6/1979 | |
| JP | 62-96197 A | | 5/1987 | |
| JP | 2000-505017 A | | 4/2000 | |
| JP | 3116265 B2 | | 12/2000 | |
| JP | 2003-135865 A | | 5/2003 | |
| JP | 2010-531956 A | | 9/2010 | |
| JP | 4920823 B2 | | 4/2012 | |
| TW | 200933026 A | | 8/2009 | |
| WO | 97/10993 A1 | | 3/1997 | |
| WO | 00/42318 A1 | | 7/2000 | |
| WO | 2009/004420 A2 | | 1/2009 | |
| WO | 2011/091448 A2 | | 7/2011 | |

OTHER PUBLICATIONS

Office Action dated Oct. 21, 2015 in corresponding Taiwan Patent Application No. 103114478 (with a partial English translation) (6 pages).
U.S. Appl. No. 14/870,776, Handa et al, filed Sep. 30, 2015.

* cited by examiner

UNDERWATER DEVICE AND METHOD FOR CONTROLLING POSTURE OF UNDERWATER DEVICE

This application is a continuation application based on a PCT Patent Application No. PCT/JP2014/061195, filed on Apr. 21, 2014, whose priority is claimed on Japanese Patent Application No. 2013-089438, filed on Apr. 22, 2013. The contents of both the PCT Application and the Japanese Application are incorporated herein by reference.

TECHNICAL FIELD

The present disclosure relates to an underwater floating-type ocean current power generation device that is able to float both upwards and downwards and is provided with a power generation unit having a turbine that is rotated by ocean currents (i.e., tidal currents), and to an underwater floating-type underwater device such as an ocean current power generation device, and to a method for controlling the posture of the same.

TECHNICAL BACKGROUND

In recent years, ocean current power generation devices that generate power using seawater flows such as ocean currents (i.e., tidal currents) and the like have been developed.

The device described in Patent document 1 is one example of this type of ocean current power generation device that generates power using the flow of seawater. This ocean current power generation device is a twin-motor underwater floating-type power generation device in which a pair of power generation units that each have a horizontal axis-type turbine that is rotated by ocean currents are connected together in parallel with each other by a connecting beam.

In this ocean current power generation device, variable pitch turbine blades are employed in each turbine of the pair of power generation units. By using variable pitch turbine blades for each turbine blade, it is possible to adjust the pitch such that the flow resistance and output of each turbine does not exceed a predetermined value.

Moreover, in this ocean current power generation device, the pair of power generation units that are linked together by a connecting beam are tethered to the seabed via a buoyancy-imparting supporting strut that is used for depth control and via three tether cables. By controlling the length of at least one tether cable out of the three tether cables that connect the buoyancy-imparting strut to the seabed by means of a length control unit that is provided on the buoyancy-imparting strut, the depth and posture of the pair of power generation units are controlled.

DOCUMENTS OF THE PRIOR ART

Patent Documents

[Patent document 1] Japanese Unexamined Patent Application No. 2010-531956

SUMMARY OF DISCLOSURE

Technical Problem

In an underwater floating-type ocean current power generation device such as that described above, because power is being generated underwater, it is desirable that the structure and control system of the device be made as simple as possible.

However, in the aforementioned ocean current power generation device in which a pair of power generation units are tethered to the seabed via a buoyancy-imparting supporting strut and three tether cables, the structure thereof and the posture control system that alters the posture thereof cannot be called simple.

The present disclosure was conceived in view of the above-described conventional problems, and it is an object thereof to provide an underwater floating-type underwater device that, in addition to having a simple structure and control system, makes it possible to reliably control the posture in a roll direction of a device main body that includes a pair of turbines, and to provide a posture control method for the same.

Solution to Problem

In order to achieve the above-described object, in the present disclosure there is provided an underwater device that includes: a plurality of turbines that rotate underwater; and a posture controller that controls posture in a roll direction by controlling rotations of the plurality of turbines, wherein the posture controller controls the posture in a roll direction by controlling the torque that is generated in each one of the plurality of turbines in accordance with the rotations of the plurality of turbines.

Moreover, the present disclosure also provides a method for controlling the posture of an underwater device in which, by controlling the torque that is generated in each one of a plurality of turbines that rotate underwater in accordance with the rotations of the plurality of turbines, the rotations of the plurality of turbines are controlled and the posture thereof in a roll direction is controlled.

Effects of Disclosure

In the underwater device and method for controlling the posture thereof according to the present disclosure, the superior effect is achieved that, without requiring a complex device structure or control system, is possible to reliably control the posture in a roll direction of a device main body that includes a pair of turbines.

DESCRIPTION OF EMBODIMENT

Hereinafter, the present disclosure will be described based on the drawings.

Figure 1:
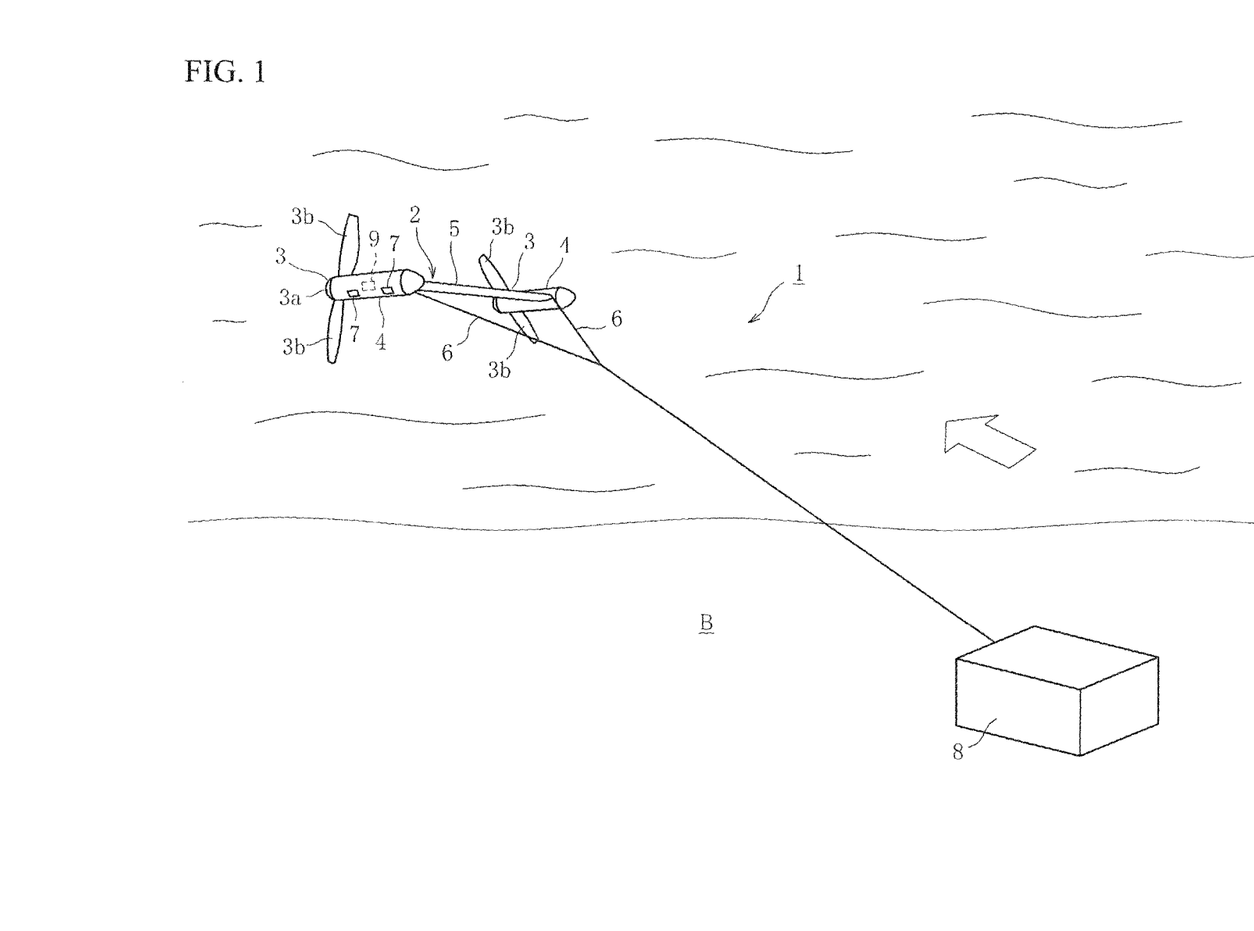
FIG. 1 is a perspective view showing the overall structure of an ocean current power generation device according to an embodiment of the present disclosure.
Figure 2A:
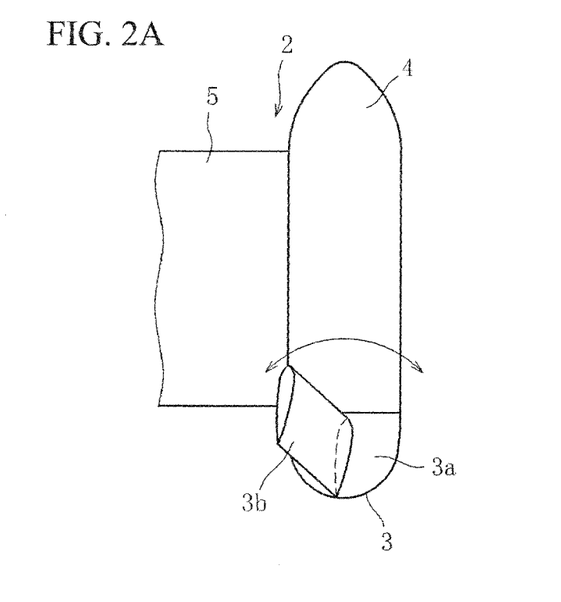
FIG. 2A is a partial plan view showing a state in which a variable pitch turbine blade of the turbine of the ocean current power generation device shown in FIG. 1 generates a small amount of resistance.
Figure 2B:
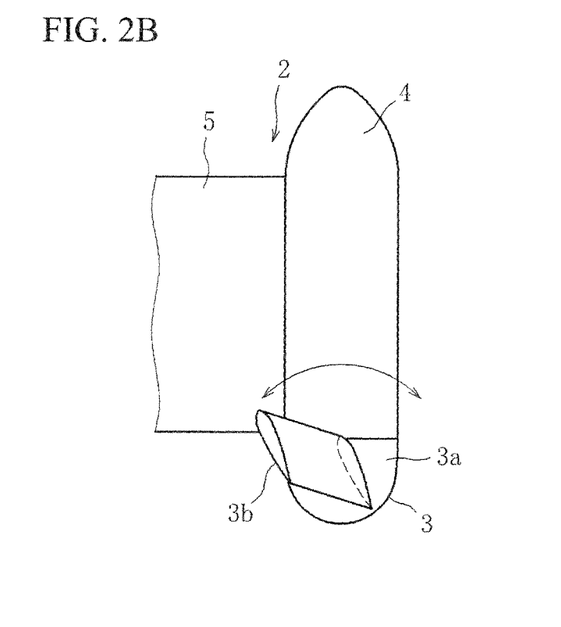
FIG. 2B is a partial plan view showing a state in which a variable pitch turbine blade of the turbine of the ocean current power generation device shown in FIG. 1 generates a large amount of resistance.

FIG. 1 and FIGS. 2A and 2B show an ocean current power generation device serving as an embodiment of the underwater device of the present disclosure.

It is essential that a twin-motor floating type of power generation device such as is shown in these drawings is able to float upwards or downwards underwater without any sizable difference occurring between the respective depths of the pair of power generation units, namely, is able to float upwards or downwards underwater while the pair of power generation units are kept substantially horizontal to each other. In the ocean current power generation device according to the present disclosure, "posture deviation in the roll direction that is generated in the pair of power generation units" refers to the horizontality of the pair of power generation units being lost so that they are no longer horizontal relative to each other.

A turbine having a radius of several tens of meters is used for the horizontal axis-type turbine that generates power when rotated by an ocean current. Therefore, a power generation unit provided with such a turbine is tethered at a depth of approximately several tens of meters. In the case of a twin-motor underwater floating-type power generation device, the power generation capacity is approximately several MW. Note that this power generation capacity varies in accordance with differences in specifications and the like.

As is shown in FIG. 1, the ocean current power generation device 1 is provided with a device main body 2 that is equipped with: a pair of left and right pods 4 and 4 that have a horizontal axis-type turbine 3 that is rotated by an ocean current indicated by the white arrow, and with a connecting beam 5 that connects these pods 4 and 4 together in parallel with each other; a sinker 8 that is fixed to the seabed; and two tether cables 6 and 6 that join this sinker 8 to the device main body 2, and thereby tether the device main body 2 to the seabed B.

The pair of pods 4 and 4 contain built-in power generators (not shown in the drawings) that are joined to the turbine shaft so as to form a power generator. The two tether cables 6 and 6 are each connected to one of the pair of pods 4 and 4 of the device main body 2, and they are also joined into a single cable which is connected to the sinker 8 so that, overall, they form a Y shape.

A turbine 3 is placed on the downstream side (i.e., on the left side in the drawing) of each one of the pair of pods 4 and 4 following the flow of seawater. The turbine 3 is formed by attaching two blades 3b and 3b to a hub 3a that is joined to a rear end portion of a turbine shaft. The turbines 3 and 3 are constructed such that they rotate in mutually opposite directions so that their respective rotation torques are canceled out.

In this case, the two blades 3b and 3b of the turbine 3 are variable pitch blades whose pitch relative to the hub 3a is able to be changed. Moreover, in the pair of pods 4 and 4 there are also provided a tilt detecting device that detects any deviation in posture in the roll direction that is generated in the pair of pods 4 and 4, and a posture controller 9 that controls the pitch of the variable pitch turbine blades 3b and 3b of the turbines 3 and 3 so as to cancel out any deviation in the posture of the pods 4 and 4 in the roll direction that is detected by this tilt detecting device.

Here, a gyro sensor (i.e., a gyroscope) or a depth meter can be employed as the tilt detecting device that detects any deviation in posture in the roll direction that is generated in the pair of pods 4 and 4, and in this embodiment a depth meter 7 is used as the tilt detecting device.

Namely, in this embodiment, depth meters 7 and 7 are provided respectively in the pair of pods 4 and 4, and any deviation in posture in the roll direction that is generated in the pair of pods 4 and 4 is detected based on differences in depth obtained by the two depth meters 7 and 7.

Note that, in order to achieve redundancy in the tilt detection system, it is also possible to employ a combination of gyro sensors and the depth meters 7 and 7.

In the posture controller 9, when a deviation in the posture of the pods 4 and 4 (i.e., of the device main body 2) in the roll direction has been detected, for example, as is shown in FIGS. 2A and 2B, by changing the pitch of the variable pitch turbine blade 3b in one of the turbines 3 out of the left and right turbines 3 from a low-resistance state to a high-resistance state so as to create a torque imbalance between the left and right turbines 3, it is possible to eliminate this deviation in the posture of the pair of pods 4 and 4 in the roll direction.

In the ocean current power generation device 1 according to this embodiment, for example, if a slight deviation in posture in the roll direction is generated in the pair of pods 4 and 4 (i.e., in the device main body 2) so that the device main body 2 begins to rotate in the roll direction, the depth meters 7 and 7 detect this rotation and output a signal to the posture controller 9.

In the posture controller 9, for example, pitch control is performed on one turbine 3 of the left and right turbines 3 in order to change the pitch of the variable pitch turbine blade 3b from the low-resistance state shown in FIG. 2A to the high resistance state shown in FIG. 2B in order to counteract the deviation in the posture of the pair of pods 4 and 4 in the roll direction that has been detected by the depth meters 7 and 7. As a result, the left and right positions of the pair of pods 4 and 4 are kept horizontal, and any rotation in the roll direction of the device main body 2 is restricted.

In other words, as well as achieving a simplification of the apparatus structure and control system, it is possible to control the posture in the roll direction of the pair of pods 4 and 4.

Figure 3:
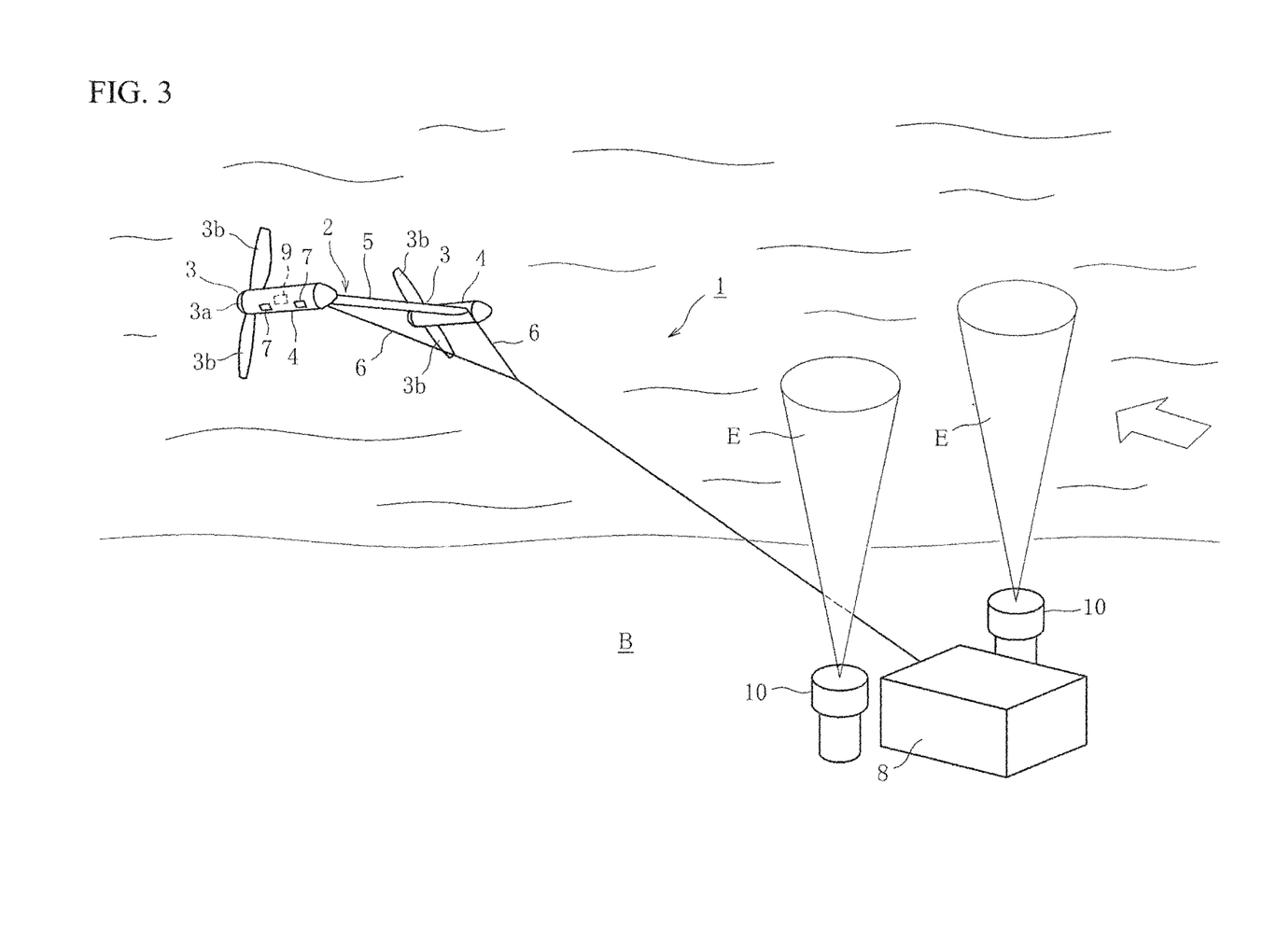
FIG. 3 is a perspective view showing the overall structure of an ocean current power generation device according to another embodiment of the present disclosure.

FIG. 3 shows another embodiment of the ocean current power generation device according to the present disclosure.

As is shown in FIG. 3, the ocean current power generation device 1 has a structure in which acoustic Doppler current profilers (ADCP) 10, which serve as flow conditions measuring device that ascertain the flow conditions of the ocean current running towards the pods 4 and 4 and output the result to the posture controller 9, are placed on the upstream side of the pair of pods 4 and 4 that are tethered to the seabed B (i.e., in the vicinity of the sinker 8 in the drawing). The remainder of the structure is the same as in the ocean current power generation device 1 according to the previous embodiment.

The acoustic Doppler current profilers 10 that are serving as flow conditions measuring device measure the flow velocity distribution in the depth direction by emitting ultrasonic waves E in an upward direction from the seabed B side. By providing a plurality of (namely two in this embodiment) of these acoustic Doppler current profilers 10, it is possible to measure changes in the flow velocity of the current running past the pair of pods 4 and 4.

In the posture controller 9 of this ocean current power generation device 1, based on measurement results for the flow velocity distribution obtained from the two acoustic Doppler current profilers 10 and 10, the pitch of the variable pitch turbine blades 3b and 3b of the pair of turbines 3 and 3 is controlled in order to forestall in advance the possibility of any change occurring in the posture of the pair of pods 4 and 4 in the roll direction.

In the ocean current power generation device 1 according to this embodiment, if the flow velocity distribution in the depth direction of the ocean current changes on the upstream side of the pair of pods 4 and 4, then it is also possible that a change in the posture of the pair of pods 4 and 4 in the roll direction will also occur. However, if this possibility does arise, the posture controller 9 controls the pitch of the variable pitch turbine blades 3b and 3b of the pair of turbines 3 and 3 based on measurement results from the acoustic Doppler current profilers 10 and 10 that measure these changes in the flow velocity distribution. As a result, it is possible to prevent the posture of the pair of pods 4 and 4 from deviating in the roll direction.

Figure 4:
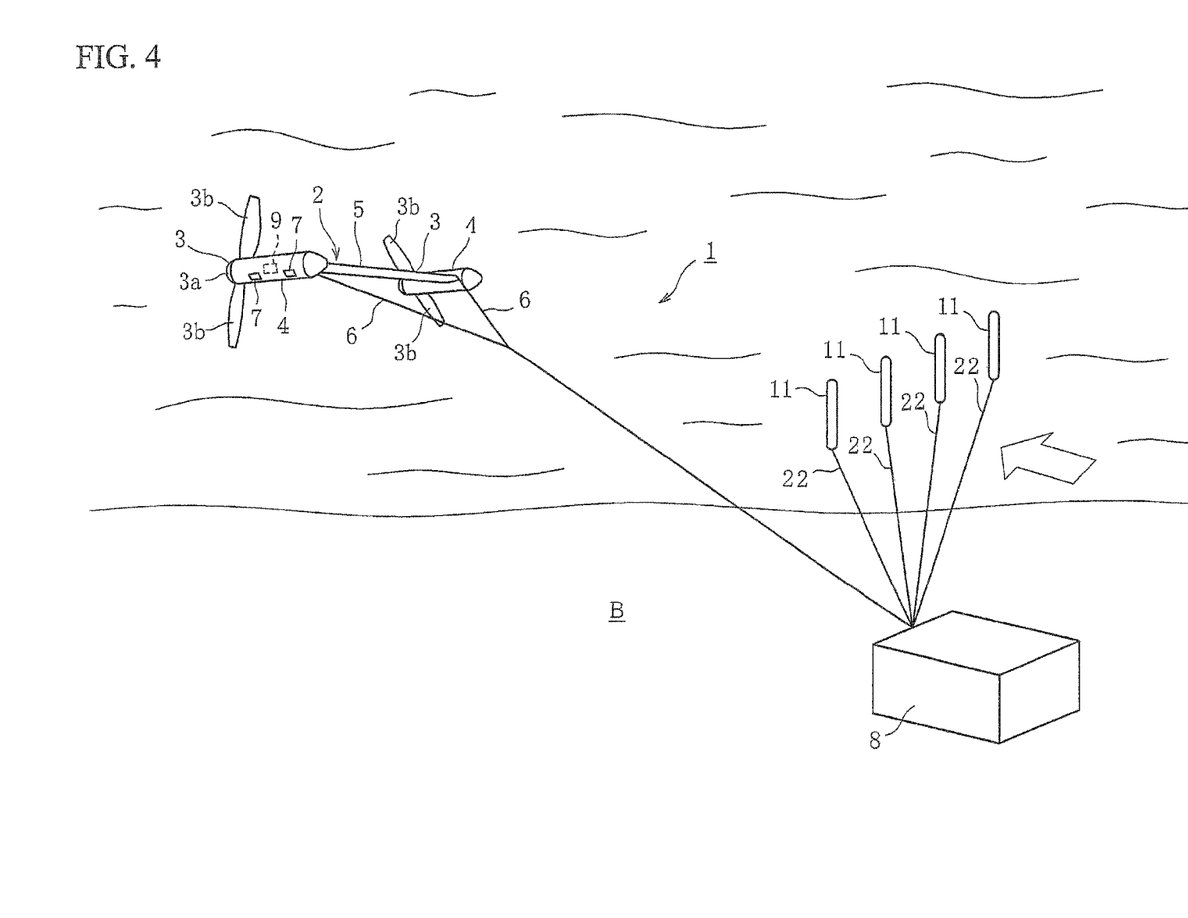
FIG. 4 is a perspective view showing the overall structure of an ocean current power generation device according to yet another embodiment of the present disclosure.

FIG. 4 shows yet another embodiment of the ocean current power generation device according to the present disclosure.

As is shown in FIG. 4, in this embodiment, a plurality of buoys 11 that measure conditions such as the flow velocity and flow direction and the like are placed on the upstream side of the pair of pods 4 and 4 as a flow conditions measuring device. Each of the plurality of buoys 11 is tethered to the sinker 8 via a cable 22.

Note that it is possible to measure the flow velocity of the current by using the aforementioned acoustic Doppler current profilers, or by using a fluid measuring instrument such as an electromagnetic flow meter or the like.

In the ocean current power generation device 1 according to this embodiment as well, if the flow conditions of the ocean current changes on the upstream side of the pair of pods 4 and 4, then it is also possible that a change in the posture of the pair of pods 4 and 4 in the roll direction will also occur. However, if this possibility does arise, the posture controller 9 controls the pitch of the variable pitch turbine blades 3b and 3b of the pair of turbines 3 and 3 based on measurement results from the plurality of buoys 11 that have recognized these changes in the flow conditions. As a result, it is possible to prevent the posture of the pair of pods 4 and 4 from deviating in the roll direction.

In the ocean current power generation device 1 according to the above-described embodiment, because the acoustic Doppler current profilers 10 and 10 or the buoys 11 that measure flow conditions are used as a flow conditions measuring device, any changes in the posture of the pair of pods (i.e., power generation units) 4 and 4 in the roll direction are prevented in advance without the structure of the device or the control system being made more complex.

Moreover, provided that the torque balance is maintained between the respective turbines 3 and 3 that are provided in the pair of pods 4 and 4, then even if the flow conditions of the ocean current around the pair of pods 4 and 4 does change, there is no deviation in the posture of the pair of pods 4 and 4 in the roll direction. For this reason, it is also possible to eliminate any deviation in the posture of the pair of pods 4 and 4 in the roll direction by measuring the torques that are generated respectively in each of the turbines 3 and 3, and then allowing the posture controller 9 to control the pitch of the variable pitch turbine blades 3b and 3b of the respective turbines 3 and 3 such that these torques are kept constant.

Figure 5:
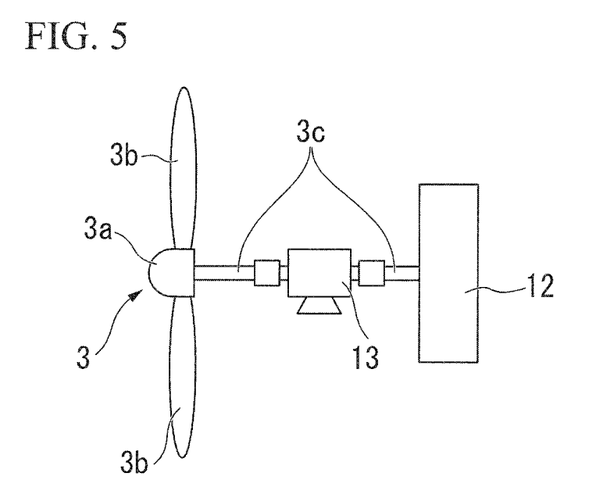
FIG. 5 is a schematic view illustrating an example of the installation state of a torque meter in the ocean current power generation device according to the present disclosure.
Figure 6:
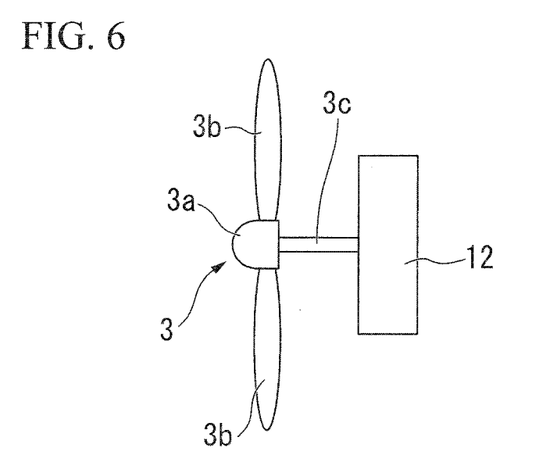
FIG. 6 is a schematic view illustrating an example of the connection state between a turbine shaft and a power generator in the ocean current power generation device according to the present disclosure.

In this case, as is shown, for example, in FIG. 5, the method used to measure the torque generated in the respective turbines 3 and 3 may be one in which a torque meter 13 that measures the torque generated in the turbine shaft 3c is installed on the turbine shaft 3c of the turbine 3, or a method in which, as is shown in FIG. 6, the torque is calculated from the output from an output device (i.e., a power generator 12) that is joined to the turbine shaft 3c, and the revolution count of the turbine shaft 3c at this time.

Furthermore, it is also possible to adjust the torque balance between the respective turbines 3 and 3 that are provided in the pair of pods 4 and 4 by adjusting the load that is applied to the turbine shafts 3c from the power generators 12 that are joined to the turbine shafts 3c. In this case, the torques generated in the respective turbines 3 are measured using a method such as those illustrated in the above-described FIG. 5 or FIG. 6, and the posture controller 9 adjusts the load that is applied from the power generator 12 to the turbine shaft 3c such that these torques are kept constant. Accordingly, it is no longer necessary for the posture controller 9 to control the pitch of the variable pitch turbine blades 3b and 3b of the respective turbines 3 and 3.

Figure 7:
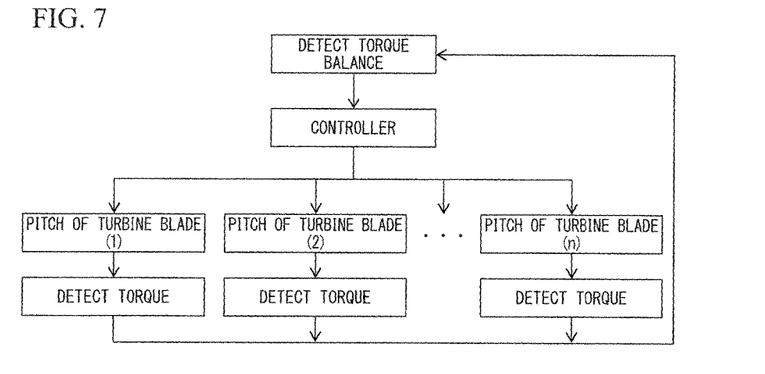
FIG. 7 is a flowchart showing an example of torque balance control that is carried out by controlling the pitch of the turbine blades in the ocean current power generation device according to the present disclosure.
Figure 8:
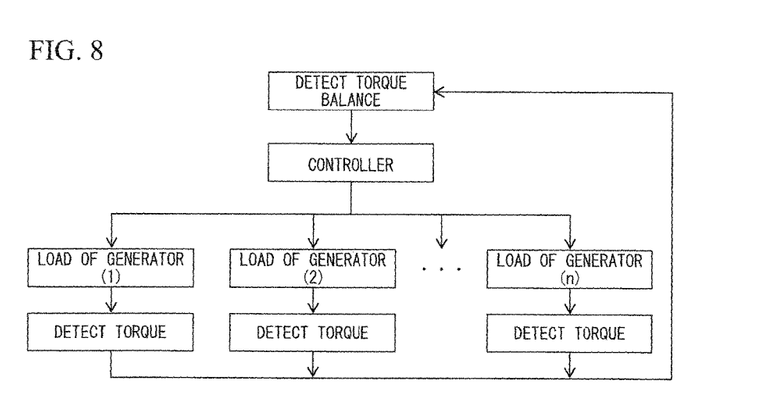
FIG. 8 is a flowchart showing an example of torque balance control that is carried out by adjusting the load from the power generator that is applied to the turbine shaft in the ocean current power generation device according to the present disclosure.

FIG. 7 and FIG. 8 are flow charts that each show an example of posture control that is achieved by adjusting the torque balance of the turbines in the ocean current power generation device that is provided with a plurality of turbines.

FIG. 7 shows an example of torque balance control that is achieved by controlling the pitch of the turbine blades, while FIG. 8 shows an example of torque balance control that is achieved by adjusting the load that is applied from the power generators to the turbine shafts.

In the example shown in FIG. 7, the torques of a plurality (i.e., n number) of turbines are measured respectively, and the torque balance between each turbine is detected from the results obtained from these measurements. A controller (corresponding to the posture controller 9) then adjusts the pitch of the variable pitch turbine blades provided in each one of the turbines and thereby controls the torque balance between the respective turbines. As a result, the torque balance between the respective turbines is kept constant, and it is possible to eliminate any deviation in the posture of the device in the roll direction.

In the example shown in FIG. 8, the torques of a plurality (i.e., n number) of turbines are measured respectively, and the torque balance between each turbine is detected from the results obtained from these measurements. A controller (corresponding to the posture controller 9) then adjusts the loads that are applied to the turbines via the turbine shafts from the power generators that are joined to the respective turbines, and thereby controls the torque balance between the respective turbines. As a result, the torque balance between the respective turbines is kept constant, and it is possible to eliminate any deviation in the posture of the device in the roll direction.

Note that in the embodiment shown in FIG. 1, what is known as feedback control is used in which any deviation in posture in the roll direction that is generated in the pair of pods 4 and 4 is detected by a tilt detecting device (i.e., the depth meter 7), and the posture of the device main body 2 is controlled based on these detection results. In contrast to this, in the embodiments shown in FIG. 3 and thereafter, what is known as feed-forward control is used in which, using changes in the state of the ocean currents that are measured using flow conditions measuring device (i.e., the acoustic Doppler current profilers 10 or the buoys 11), or using the results obtained when the torque generated in the respective turbines 3 and 3 are measured, it is possible to prevent any deviation in the posture of the pair of pods 4 and 4 in the roll direction before such a posture deviation actually occurs. Namely, the embodiments shown in FIG. 3 and thereafter have the advantage that, compared to the embodiment shown in FIG. 1, the posture of the device main body 2 can be rapidly controlled.

Moreover, it is also possible to predict or calculate the torque that will be generated in the respective turbines 3 and 3 based on the state of the ocean currents obtained using the flow conditions measuring device (i.e., the acoustic Doppler current profilers 10 or the buoys 11), and to then adjust the torque balance between the respective turbines 3 and 3 based on these results.

The structures of the ocean current power generation device and the method of controlling the posture of an ocean current power generation device according to the present disclosure are not limited to the above-described embodiments. Additions, omissions, substitutions, and other modifications can be made insofar as they do not depart from the spirit or scope of the present disclosure. Accordingly, the disclosure is not limited by the foregoing description and is only limited by the scope of the appended claims.

For example, the turbines 3 according to each of the above-described embodiments have the two variable pitch turbine blades 3b and 3b, however, the number of turbine blades is not limited to this. The installation position of the turbines 3 in the respective pods 4 is also not limited to the tail portion of the pod 4, and the turbines 3 may also be installed in a front portion (i.e., on the sinker 8 side) or in an intermediate portion of the pod 4, or in a combination of these positions. Moreover, in each of the above-described embodiments, a pair of left and right pods 4 and 4 are connected together via the connecting beam 5, however, it is also possible for three or more pods 4 and 4 to be joined together via the connecting beam 5 or the like.

Furthermore, it is also possible for a plurality of pods 4 and 4 to be arranged vertically to each other, or both vertically and horizontally to each other.

Moreover, in addition to a Y shape in which tether cables 6 extend out from each pod 4 and 4 and are then joined together partway along their length, the shape of the tether cable 6 may also be a V shape in which one end of each tether cable 6 extends from each of the pods 4 and 4, and the other end thereof is connected to the same sinker 8. Alternatively, it is also possible for either one or a plurality of tether cables 6 to extend from each individual pod 4, or from the connecting beam 5. If a plurality of pods 4 and 4 are arranged both vertically and horizontally relative to each other, then the tether cables 6 that extend out from each of these pods 4 and 4 may be arranged three-dimensionally such as, for example, in an X shape when viewed from the front. Moreover, the number of sinkers 8 to which the other end of the tether cables 6 is connected may either be one or a plurality of sinkers 8. Alternatively, a known tethering method other than using the tether cable 6 may also be employed.

Moreover, in each of the above-described embodiments, a case is described in which the present disclosure is applied to the ocean current power generation device 1, however, the present disclosure may also be applied to underwater devices other than the ocean current power generation device 1 that are provided with a plurality of turbines and perform posture control using these turbines. For example, the present disclosure may also be applied to manned or unmanned self-propelled underwater sailing vessels, towed barges, and other structural objects (i.e., floating bodies and the like) that are confined underwater.

INDUSTRIAL APPLICABILITY

According to the present disclosure, it is possible to provide an underwater floating-type underwater device ocean current that, in addition to having a simple structure and control system, makes it possible to reliably control the posture in a roll direction of a device main body, and to provide a posture control method for the same.

What is claimed is:

1. An underwater device comprising:
   a plurality of horizontal axis-type turbines that rotate underwater, each of the turbines comprising variable pitch turbine blades;
   a plurality of pods, each of the pods housing at least one of the turbines;
   a connecting beam connecting the pods;
   a plurality of tilt detecting devices disposed at the plurality of pods and that detect deviation in posture in a roll direction that is generated in the pods;
   a posture controller that controls the posture in the roll direction of the plurality of turbines and keeps each one of the pods substantially horizontal to each other, and
   a torque meter that measures a torque that is generated respectively in each one of the plurality of turbines;
   wherein the posture controller: (i) receives a measured torque for each one of the plurality of turbines from the torque meter and (ii) controls the posture in the roll direction and keeps each one of the pods substantially horizontal to each other by controlling, based on the measured torque for each one of the plurality of turbines, the torque that is generated in at least one of the plurality of turbines by controlling a pitch of the variable pitch turbine blades of the at least one of the plurality of turbines so as to cancel out the deviation in the posture of the pods in the roll direction detected by the plurality of tilt detecting devices.

2. The underwater device according to claim 1, wherein the underwater device is an underwater tethered-type ocean current power generation device that is provided with a plurality of power generation units which have the plurality of turbines that are rotated by sea currents, and which generate power using the rotation of the plurality of turbines,
   the plurality of power generation units are installed in the plurality of pods, and
   wherein the posture controllers that control the pitch of the variable pitch turbine blades of the respective turbines in the plurality of power generation units so as to nullify any deviation in the posture in the roll direction that has been generated in the plurality of power generation units and has been detected by the plurality of tilt detection devices.

3. The underwater device according to claim 2, wherein a flow conditions measuring device that ascertains the flow conditions of an ocean current running towards the plurality of power generation units and outputs these flow conditions to the posture controller is placed on an upstream side of the plurality of power generation units that are tethered to the seabed, and, based on measurement results obtained from the flow conditions measurement device, pitch control is performed by the posture controller on the variable pitch turbine blades of the respective turbines of the plurality of power generation units in order to forestall in advance the possibility of any change occurring in the posture of the plurality of power generation units in the roll direction.

4. The underwater device according to claim 3, wherein an acoustic Doppler current profiler that is able to measure flow velocity distributions in a depth direction is used as the flow conditions measuring device, and a plurality of these acoustic Doppler current profilers are placed on an upstream side of the plurality of power generation units.

5. The underwater device according to claim 3, wherein a buoy that measures flow conditions is used as the flow conditions measuring device, and a plurality of these buoys are placed on an upstream side of the plurality of power generation units.

6. The underwater device according to claim 1, wherein each one of the plurality turbines includes a turbine shaft installed in a respective pod and a power generator joined to the turbine shaft such that the torque meter calculates the torque of a respective turbine based on an output of the power generator and a revolution count of the turbine shaft, and the posture controller controls the torque generated in each one of the plurality turbines by adjusting a load applied to each one of the plurality of turbines from a respective turbine shaft joined to a respective power generator.

7. The underwater device according to claim 1, wherein the posture controller controls the torque generated respectively in each one of the plurality of turbines in accordance with a measurement result from a flow condition measuring device provided upstream of the pods.

8. The underwater device according to claim 1, wherein the posture controller controls a pitch of at least one of the plurality of turbines to create a torque imbalance between the one of the plurality of turbines and another of the plurality of turbines to cancel deviation in posture between one of the plurality of pods and another of the plurality of pods.

9. A method for controlling the posture of an underwater device comprising a plurality of horizontal axis-type turbines that rotate underwater, each one of the turbines comprising variable pitch turbine blades, a plurality of pods, each one of the pods housing at least one of the turbines, a connecting beam connecting the pods, a plurality of tilt detecting devices disposed at the plurality of pods and that detect deviation in posture in a roll direction that is generated in the pods, and a posture controller that controls the posture in the roll direction of the plurality of turbines;

the method comprising:
controlling a torque that is generated in at least one of the plurality of turbines by controlling, with the posture controller, a pitch of the variable pitch turbine blades of the at least one of the plurality of turbines to create an imbalance of torque of one of the plurality of turbines relative to another of the plurality of turbines such that the posture of the plurality of turbines in the roll direction is controlled so as to cancel out the deviation in the posture of the pods in the roll direction that is detected by the plurality of tilt detecting devices.

10. The method for controlling the posture of the underwater device according to claim 9, wherein the underwater device is an underwater tethered-type ocean current power generation device that is provided with a plurality of power generation units which have the plurality of turbines that are rotated by sea currents, and which generate power using the rotation of the plurality of turbines, and the plurality of power generation units are installed in the plurality of pods, and
pitch control of the variable pitch turbine blades of the respective turbines in the plurality of power generation units is performed so as to nullify any deviation in the posture in the roll direction that has been generated in the plurality of power generation units.

11. The method for controlling the posture of the underwater device according to claim 9, wherein the posture controller controls the torque generated respectively in each one of the plurality of turbines in accordance with a measurement result from a flow condition measuring device provided upstream of the pods.

12. The method for controlling the posture of the underwater device according to claim 9, wherein the underwater device includes a torque meter that measures a torque that is generated respectively in each of the plurality of turbines, and the method further includes receiving, by the posture controller, a measured torque for each one of the plurality of turbines from the torque meter; and controlling, with the posture controller, the posture in the roll direction of the plurality of turbine to keep each one of the pods substantially horizontal to each other by controlling, based on the measured torque for each of the plurality of turbines, the torque that is generated in at least one of the plurality of turbines by controlling a pitch of the variable pitch turbine blades of the at least one of the plurality of turbines so as to cancel out the deviation in the posture of the pods in the roll direction detected by the plurality of tilt detecting devices.

* * * * *